United States Patent [19]

Borugian

[11] 4,372,430

[45] Feb. 8, 1983

[54] DRUM BRAKE AND RETAINING SPRING

[75] Inventor: Dennis A. Borugian, Farmington Hills, Mich.

[73] Assignee: Eaton Corporation, Cleveland, Ohio

[21] Appl. No.: 318,227

[22] Filed: Nov. 4, 1981

Related U.S. Application Data

[63] Continuation of Ser. No. 124,487, Feb. 25, 1980, abandoned.

[51] Int. Cl.³ .............................................. F16D 51/22
[52] U.S. Cl. .................................... 188/329; 188/216; 188/250 C; 188/341; 267/61 R; 267/179
[58] Field of Search ................... 188/216, 250 C, 327, 188/328, 329, 334, 341; 267/61 R, 73, 74, 166, 179

[56] References Cited

U.S. PATENT DOCUMENTS

| 2,710,076 | 6/1955 | Russell ................................ 188/341 |
| 2,885,032 | 5/1959 | Dombeck . |
| 3,283,858 | 11/1966 | Mossey et al. ...................... 188/341 |
| 3,459,281 | 8/1969 | Lepelletier .......................... 188/341 |
| 3,623,193 | 11/1971 | Rikard ............................. 24/261 R |
| 4,088,311 | 5/1978 | Rupprecht ........................... 267/74 |

FOREIGN PATENT DOCUMENTS 920654  1/1947  France ............................... 188/327

Primary Examiner—George E. A. Halvosa
Attorney, Agent, or Firm—C. H. Grace; H. D. Gordon

[57] ABSTRACT

An improved drum brake (10) is provided with an improved retaining spring (28) which passes over or close to the axis of the brake anchor structure (18). The improved retaining spring is a one-piece coil tension spring comprising a coil portion (46) and an attachment portion (50) extending axially from the opposite ends of the coil portion. Each attachment portion comprises a downwardly extending first section (52), an upwardly and outwardly extending second section (56), a downwardly extending third section (62) and an axially extending fourth section (64).

4 Claims, 6 Drawing Figures

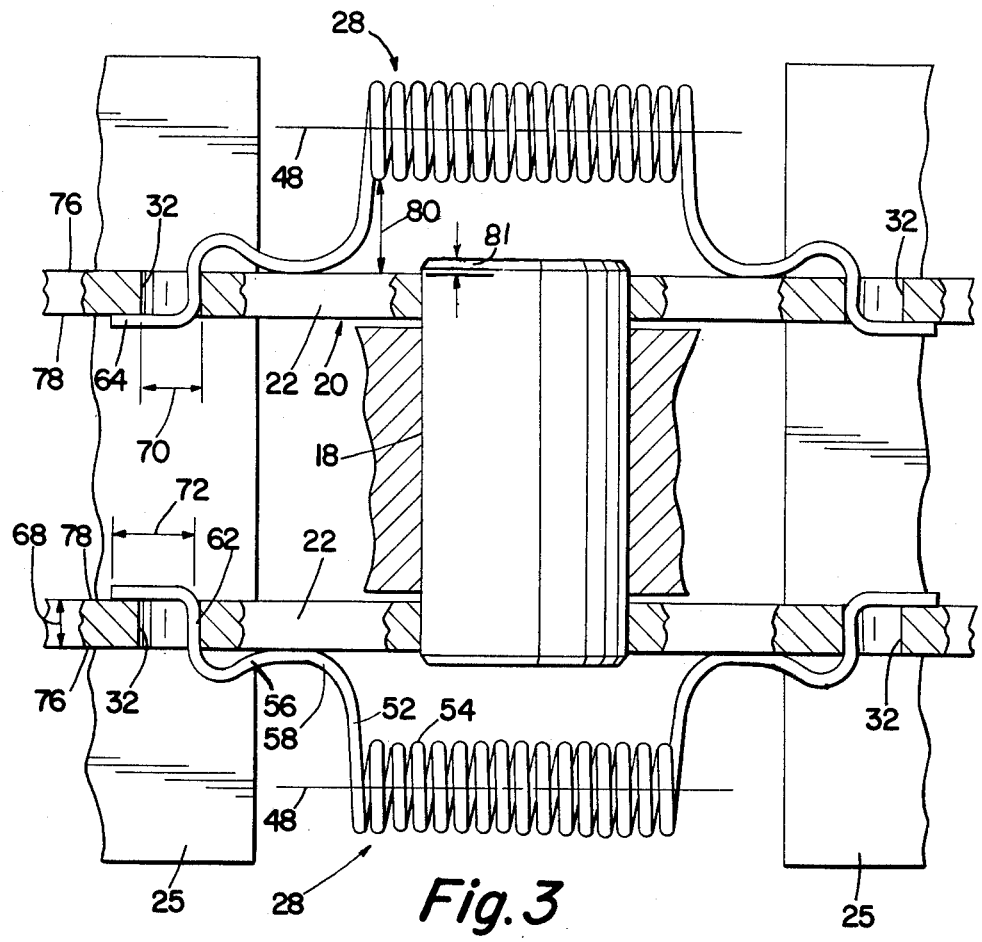
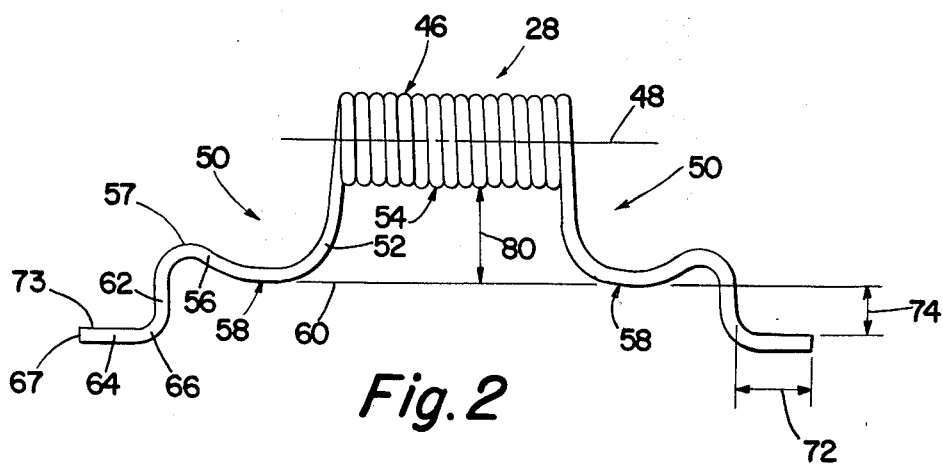

DRUM BRAKE AND RETAINING SPRING

This is a continuation, of application Ser. No. 124,487, filed Feb. 25, 1980, now abandoned.

BACKGROUND OF THE INVENTION

1. Field of the Invention

This invention relates to drum brakes, and in particular to drum brakes having an improved retaining spring structure for retaining the brake shoes pivotably to an anchor member.

2. Background of the Invention

Drum brakes having a pair of generally arcuate brake shoes pivotably mounted at one end to an anchor structure and selectively actuatable at the other ends thereof to pivot radially outwardly relative to the anchor structure to frictionally engage a brake drum are well known in the prior art. Usually, the brake shoes comprise an arcuate table carrying the friction material and at least one radially inwardly extending rib or web. Typically, the pivotably mounted ends of the brake shoe webs are formed with generally concave surfaces which are pivotably supported by an anchor structure comprising a single anchor pin, or a pair of anchor pins, fixed to the brake spider. A resilient retaining member, or members, such as a coil tension spring is utilized to retain the brake shoes against the anchor member. Examples of such prior art drum brakes may be seen by reference to U.S. Pat. Nos. 2,710,076; 3,467,229 and 3,497,037, all assigned to the assignee of this invention and all hereby incorporated by reference.

While these prior art devices are generally satisfactory and enjoy great commercial success, a problem has occasionally existed with the retaining means, or retaining springs, thereof. In particular, the retaining springs of the prior art devices usually utilized hook type ends which under certain conditions, such as vibration of the springs at or near a resonant frequency, might come free from the brake shoes and fall into the assembly. Also, the retaining springs of the prior art devices were often spaced a considerable distance from the anchor means or bended around the support means, and thus were flexed every time the brake was applied and released, thereby increasing the possibility of a failure of the retaining springs.

SUMMARY OF THE INVENTION

In accordance with the present invention, the drawbacks of the prior art have been reduced or eliminated by the use of an improved one-piece tension coil retaining spring. The improved retaining spring comprises a central axially extending coil portion designed to be resiliently deformed axially outwardly in tension and an attachment mounting portion extending from each end of the coil portion. Each attachment portion comprises a first section extending downwardly from the bottom of the coil portion, a second section extending upwardly and axially outwardly from the first section to a point below the bottom of the coil portion, a third section extending downwardly from the second section to an end located below the junction of the first and second sections and a fourth section extending axially outwardly from the third section and generally parallel to the axis of the coil portion. The third sections are designed to pass through spaced apertures in the brake shoe webs and the fourth sections will engage the underside of the shoe webs while the junction of the first and second sections will engage the upper or outer surface of the shoes to raise the coil portion of spring above the shoe webs. The coil portion of the spring is preferably located to pass over the anchor pin, or pins, to minimize deflections of the springs during the brake applying and releasing pivotal movement of the shoes about the axis of the anchor pin or pins.

Accordingly, it is an object of the present invention to provide a new and improved drum brake.

A further object of the present invention is to provide a new and improved drum brake having improved brake shoe coil tension retaining springs.

These and other objects and advantages of the present invention will become apparent from a reading of the detailed description of the invention taken in connection with the drawings.

BRIEF DESCRIPTION OF THE DRAWINGS

FIG. 2 is a plan view of the improved one-piece coil tension retaining spring of the present invention.

FIG. 3 is a fragmentary view of the brake shoes of the present invention as retaining against an anchor pin by the springs of FIG. 2.

DESCRIPTION OF THE PREFERRED EMBODIMENT

Figure 1:
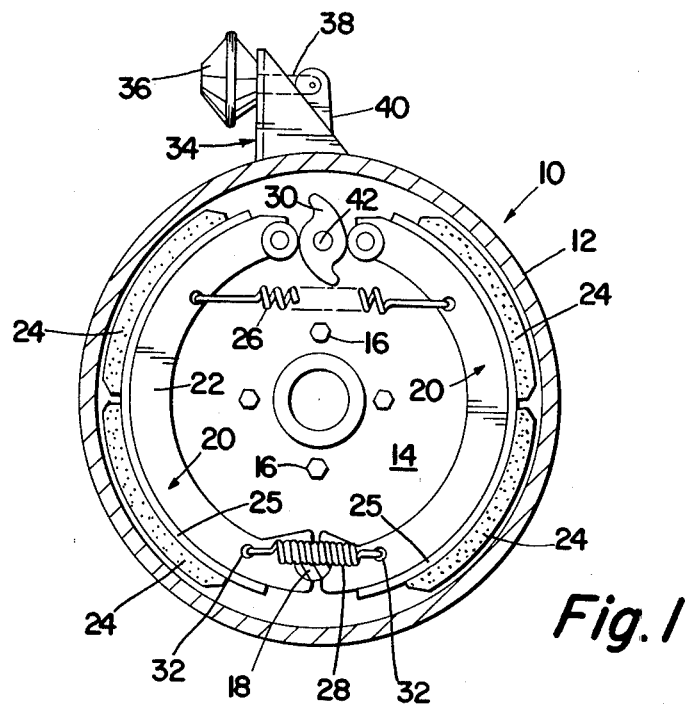
FIG. 1 is an illustration of the improved cam actuated expanding shoe drum brake of the present invention.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the designated parts. Said terminology will include the words above specifically mentioned, derivatives thereof and words of similar import.

Figure 4:
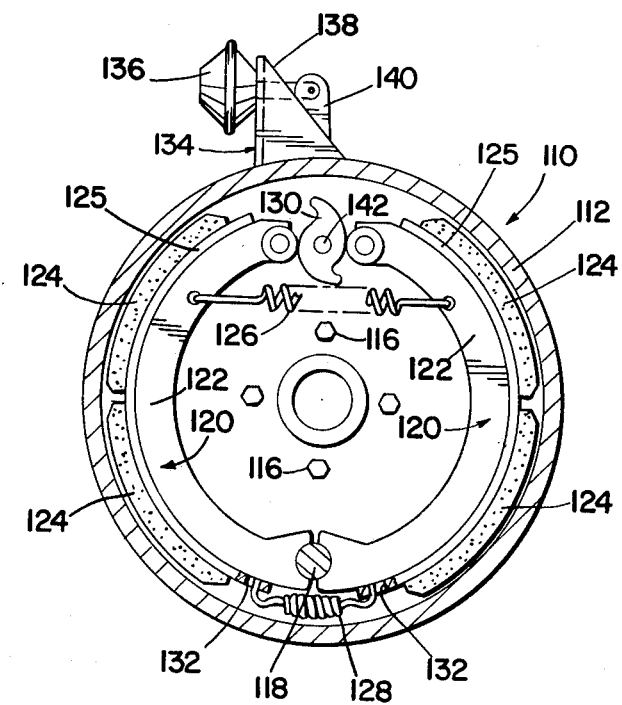
FIGS. 4, 5 and 6, respectively, are views of the prior art corresponding to FIGS. 1, 2 and 3, respectively.

Drum brakes, such as the vehicle drum brake 10 of the present invention and the drum brake 110 of the prior art, respectively, may be seen by reference to FIGS. 1 and 4, respectively. Drum brake 110 of prior art, with the exception of the improvements to be described below in greater detail, is substantially identical to the drum brake 10 and similar elements of prior art brake 110 will be assigned the same reference numerals as elements of brake 10 with the number "1" prefixed thereto and will not be described in detail.

Brake assembly 10 comprises an annular rotatable brake drum 12, a brake support member or spider 14 nonrotatably secured to the vehicle by a plurality of fasteners 16, a brake shoe pivot or anchor pin 18 secured to the spider 14, a pair of opposed arcuate brake shoes 20 including brake lining supports or webs 22 and a brake lining 24 of suitable friction material carried by the tables 25, brake shoe return springs 26, brake shoe retaining springs 28 for retaining the shoes 20 on anchor pin 18, and a cam element 30 for causing radially outwardly pivotal movement of the brake shoes 20 about anchor pin 18 for braking the movement of the vehicle. The retaining springs 28 of brake assembly 10 are tension springs and are retained in the apertures 32 formed in the webs 22 of the brake shoes 20. The retaining springs 128 of prior art brake assembly 110 are tension springs retained in apertures 132 formed in the tables 125.

A brake actuator support, or air motor bracket, 34 is fixed to the spider 14 and a brake actuator, such as an air motor 36, is fixed to the actuator support. Oscillatory movement of the actuator 36 is converted into rotational movement of the cam 30 by means of a link 38, a lever or slack adjuster 40 and a cam shaft 42 as is well known in the prior art. Although a rotatable cam 30 is illustrated, other actuation means, such as wedges or the like, may be utilized as is known in the art.

As may be seen by reference to FIG. 1, the apertures 32 are located relatively closely to the axis of anchor pin 18 and define a line therebetween which passes through, or close to, the axis of anchor pin 18. Accordingly, tension retaining springs 28 will be subject to minimal deflection as a result of the brake shoes 20 pivotal movement about anchor pin 18 during brake application and release. The prior art devices 110 as seen in FIG. 4 utilize apertures 132 which are spaced a relatively large distance from anchor pin 118 and define a line therebetween which is spaced considerably from the axis of the anchor pin 118 and thus the retaining springs 128 of the prior art are subject to considerable deflection during the brake application and release operations.

The improved retaining spring 28 and the use thereof to retain the brake shoes 20 to the anchor pin 18 may be seen in greater detail by reference to FIGS. 2 and 3. In the embodiment shown, the brake shoes 20 have twin webs 22 and utilizes two retaining springs 28 to retain the brake shoes to a single anchor pin 18. It is recognized, however, that the present invention is also applicable to brakes having shoes with a single web and/or single retaining spring and/or a different type of brake shoe pivot such as twin anchor pins or the like.

Retaining spring 28 is formed from a suitable material, such as steel valve spring wire or the like. The spring comprises a coil portion 46 having a suitable number of working coils extending along an axis 48 and having a suitable spring rate, such as about fifty pounds per inch. An attachment portion 50 extends axially, outwardly from each end of the coil portion 46. Each attachment portion comprises a first section 52 extending generally downwardly from the bottom 54 of the coil portion 46, a second section 56 extending generally upwardly and axially outwardly to a point 57 below the bottom 54 of the coil portion. The junctions 58 of the first and second sections define a line 60 generally parallel to the axis 48 of the coil portion and below the bottom 54 of the coil portion. The junction 58 may be curved or angular and the sections may be curved or generally straight. A third section 62 of the attachment portion extends generally downwardly from the second section and a fourth section 64 extends generally axially outwardly from the bottom end 66 of the third section and generally parallel to axis 48. As may be seen, the junction 66 of the third and fourth sections is located below the junction 58 of the first and second sections.

As may be seen by reference to FIGS. 2 and 3, webs 22 of the shoes 20 have spaced apertures 32 therein for receipt of the attachment portions 50 of the retaining springs 28. The apertures are spaced such that the springs 28 are in tension when installed to retain the shoes 20 pivotally against the anchor pin 28. The webs 22 have a thickness 68 and the apertures 32 have a diameter 70. The axially extending sections 64 of spring 28 have an axial length 72 and the distance from the top surface 73 of sections 64 to the junction 58 of first and second sections, in the undeformed position of spring 28, is designated as 74.

The thickness 68 of the webs 22 is equal to or greater than the undeformed separation 74 of surfaces 73 and junctions 58 and thus, upon insertion of the spring into the apertures 32, the surface 58 will be resiliently urged against the outer surfaces 76 of the webs and the surfaces 73 will be resiliently urged against the inner surfaces 78 of the webs. The axial length 72 of section 64 is greater than the diameter 70 of apertures 32 and thus temporary axial expansions, compressions and/or movements of spring 28 relative to webs 22, as may occur under certain vibratory conditions, will not result in disengagement of the springs from the webs by the sections 64 passing through apertures 32.

The curved bottom surfaces of the junctions 58 are separated from the bottom 54 of the coil portions 46 by a distance 80 which is greater than the extension 81 of the anchor pin from the outer surface 76 of the web. Accordingly, the coil portion 48 of the springs 28 are elevated by distance 80 above the outer surfaces 76 of the webs 22 sufficient to pass over the anchor pins 18. This allows the springs 28 to be placed in the brake assembly for minimal deflection during the brake application and release operations and also separates the coil portions 46 from the heat present in the brake tables and whatever heat may be present in the webs of the shoes.

To install the springs 28 of the present invention, one end 67 of the fourth section 64 is inserted into one aperture and the spring is then pivoted and deformed such that the coil portion is slightly concave and the other end of the other fourth section is inserted into the other aperture 32. The spring is then allowed to resiliently return to the position shown in FIG. 3 and the shoes are placed onto the anchor pin 18.

Figure 6:
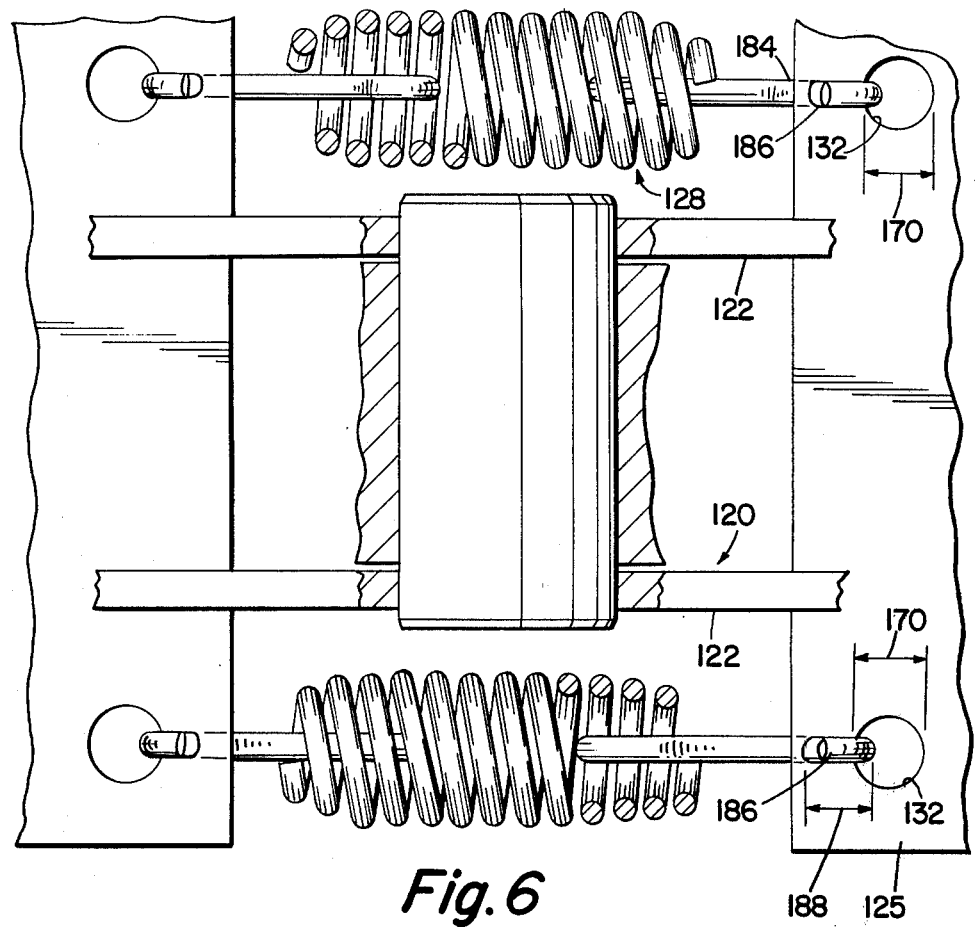
Figure 5:
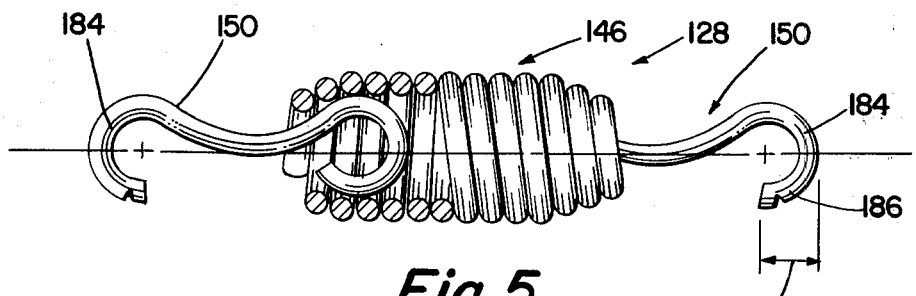

The prior art retaining spring 128 and the prior art brake shoe and anchor pin assembly may be seen in FIGS. 5 and 6. The retaining spring 128 comprised a coil portion 146 and two retaining portions 150 extending from each end of the coil portion. Often, the coil and retaining portions were not integral. An inwardly curved hook section 184 was formed at the outer end of the retaining portions. The inwardly extending free ends 186 of the hook portions have an axial length 188 which was usually of a lesser length than the diameter 170 of the apertures 132. As the axial length 188 of the free ends 186 was less than the diameter of the apertures 132, if the spring 128 lost tension, or became temporarily axially expanded as the result of vibrations, the free ends 186 of the hooks 184 occasionally worked out of the apertures 132 and the springs 128 would fall out of the brake allowing the shoes to disengage the anchor pin 118 and/or fall into the brake mechanism resulting in damage thereto.

As may be seen from the above, the improved brake provides a retaining spring structure which is relatively simple and inexpensive to produce and which is resistant to falling out of engagement as the result of vibrations and the like. Further, the improved spring structure allows the brake to be provided with a retaining spring which passes over the anchor means thereby being positioned to minimize deflections thereof during the brake application and release operations.

While the invention has been described in certain preferred embodiments, such description is by way of reference only and various modifications thereto may be resorted to without departing from the spirit and the scope of the invention as hereinafter claimed.

I claim:

1. An improved drum brake of the type comprising a rotatably mounted drum, a fixed support, a single anchor pin fixed to the support, a pair of arcuate brake shoes each including at least one web and a friction lining, both of said brake shoes pivotably supported at one end of the webs thereof on said anchor pin, said webs defined by first and second substantially parallel surfaces extending generally perpendicular to the axis of said anchor pin, said first surfaces defining the top of said webs and said second surfaces defining the bottoms of said webs, said anchor pin extending upwardly beyond the first surfaces of said webs by a first axial distance, a brake shoe coil tension retaining spring having one end thereof attached to one of said shoes and the other end thereof attached to the other of said shoes for retaining said shoes pivotably on said anchor pin and an actuating member for selectively radially outwardly pivoting said shoes about said anchor pin, the improvement comprising:

said retention spring being of a one-piece construction comprising an axially extending centrally located coil portion and an attachment portion extending axially outwardly from each of the opposite ends of said coil portion, each attachment portion defined by a first section extending generally downwardly from the bottom of the coil portion, a second section extending upwardly and axially outwardly from the bottom of the first section and terminating at a point below the bottom of the coil portion, a third section extending downwardly from said second section to a point below the bottom of the junction of said first and second sections and a fourth section extending generally axially outwardly from the bottom end of said third section, each of said webs provided with an aperture, each of said fourth sections having an axial length exceeding the diameter of said apertures, a line connecting the axis of said apertures passing through said anchor pin when said shoes pivotably retained on said anchor pin, said spring being inserted into said apertures from the first surfaces of said webs such that said fourth sections engage said second surfaces, the junctions of said first and second sections engaging said first surface and said coil portion elevated above said first surfaces by a distance greater than said first axial distance.

2. The improved drum brake of claim 1 wherein said actuating member is a rotatable cam.

3. The improved drum brake of claim 1, wherein said apertures in the released position of said brake are spaced apart by a distance less than the distance between said third sections in the undeformed position of said retaining spring.

4. The improved drum brake of claim 3, wherein said fourth section and the junction of said first and second sections are separated by a distance in the undeformed position of said spring which is equal to or less than the thickness of said web.

* * * * *